United States Patent
Nabeshima

(10) Patent No.: US 11,498,406 B2
(45) Date of Patent: Nov. 15, 2022

(54) HYBRID VEHICLE

(71) Applicant: SUBARU CORPORATION, Tokyo (JP)

(72) Inventor: Akihiro Nabeshima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 381 days.

(21) Appl. No.: 16/743,368

(22) Filed: Jan. 15, 2020

(65) Prior Publication Data

US 2020/0307370 A1 Oct. 1, 2020

(30) Foreign Application Priority Data

Mar. 25, 2019 (JP) .............................. JP2019-056665

(51) Int. Cl.
| | | |
|---|---|---|
| *B60K 6/365* | (2007.10) | |
| *B60K 6/547* | (2007.10) | |
| *B60K 6/387* | (2007.10) | |
| *B60K 6/40* | (2007.10) | |
| *B60K 6/44* | (2007.10) | |

(52) U.S. Cl.
CPC .............. *B60K 6/365* (2013.01); *B60K 6/387* (2013.01); *B60K 6/40* (2013.01); *B60K 6/547* (2013.01); *B60K 6/44* (2013.01); *B60Y 2200/92* (2013.01); *F16H 2200/201* (2013.01); *F16H 2200/2041* (2013.01)

(58) Field of Classification Search
None
See application file for complete search history.

(56) References Cited

U.S. PATENT DOCUMENTS

| | | | | |
|---|---|---|---|---|
| 10,272,765 | B1 * | 4/2019 | Cho | B60K 6/543 |
| 10,780,769 | B1 * | 9/2020 | Cho | B60K 6/36 |
| 10,851,875 | B1 * | 12/2020 | Park | B60K 6/387 |
| 11,207,969 | B2 * | 12/2021 | Park | B60K 17/16 |
| 2017/0066317 | A1 * | 3/2017 | Kurosaki | B60K 6/383 |
| 2017/0096058 | A1 * | 4/2017 | Kanada | F16H 3/728 |

(Continued)

FOREIGN PATENT DOCUMENTS

JP 2018-001884 A 1/2018

*Primary Examiner* — Jeffrey J Restifo

(74) *Attorney, Agent, or Firm* — McDermott Will & Emery LLP

(57) ABSTRACT

A hybrid vehicle includes a planetary gear mechanism, a first electric motor, an internal combustion engine, first drive wheels, an inter-element clutch, a second electric motor, and second drive wheels. The planetary gear mechanism is configured to transmit motive power among first to third rotary elements. The first electric motor is coupled to the first rotary element in a power transmittable manner. The internal combustion engine is coupled to the second rotary element in a power transmittable manner. The first drive wheels are coupled to the third rotary element in a power transmittable manner. The inter-element clutch is configured to switch between coupling and uncoupling two of the first to third rotary elements. The second electric motor is configured to perform power running operation using power generated by the first electric motor. The second drive wheels are coupled to the second electric motor in a power transmittable manner.

4 Claims, 6 Drawing Sheets

(56) References Cited

U.S. PATENT DOCUMENTS

| | | | | |
|---|---|---|---|---|
| 2018/0022203 | A1* | 1/2018 | Bans | B60K 6/445 180/65.235 |
| 2018/0022342 | A1* | 1/2018 | Takagi | B60K 6/365 180/65.23 |
| 2018/0222308 | A1* | 8/2018 | Imamura | B60K 6/365 |
| 2019/0071066 | A1* | 3/2019 | Imamura | B60K 6/365 |
| 2019/0126736 | A1* | 5/2019 | Aoki | B60W 50/0097 |
| 2019/0184806 | A1* | 6/2019 | Aoki | F16H 3/728 |
| 2019/0184807 | A1* | 6/2019 | Okamura | B60K 1/00 |
| 2019/0248356 | A1* | 8/2019 | Imamura | F16H 61/682 |
| 2019/0276000 | A1* | 9/2019 | Suzuki | B60W 20/00 |
| 2019/0291563 | A1* | 9/2019 | Ogino | F16H 3/72 |
| 2020/0086847 | A1* | 3/2020 | Ebuchi | B60W 20/40 |
| 2020/0148190 | A1* | 5/2020 | Imamura | B60W 20/30 |
| 2020/0189381 | A1* | 6/2020 | Oshiumi | B60W 30/18109 |
| 2020/0207327 | A1* | 7/2020 | Imamura | B60K 6/445 |
| 2020/0223427 | A1* | 7/2020 | Shimura | B60K 6/28 |
| 2020/0307370 | A1* | 10/2020 | Nabeshima | B60K 6/448 |
| 2020/0307549 | A1* | 10/2020 | Ebuchi | B60W 30/1846 |
| 2020/0398820 | A1* | 12/2020 | Okamura | B60K 6/547 |
| 2021/0016767 | A1* | 1/2021 | Imamura | B60K 17/02 |
| 2021/0031746 | A1* | 2/2021 | Tabata | B60W 20/15 |
| 2021/0086747 | A1* | 3/2021 | Tabata | B60K 6/365 |
| 2021/0086748 | A1* | 3/2021 | Tabata | B60W 30/184 |
| 2021/0107445 | A1* | 4/2021 | Matsubara | B60W 30/182 |
| 2021/0222757 | A1* | 7/2021 | Ebuchi | F16H 63/30 |
| 2021/0339619 | A1* | 11/2021 | Kaltenbach | B60K 6/365 |
| 2021/0347244 | A1* | 11/2021 | Kaltenbach | B60K 6/48 |
| 2021/0372488 | A1* | 12/2021 | Isami | F16D 23/10 |
| 2022/0024295 | A1* | 1/2022 | Kaltenbach | B60K 6/40 |
| 2022/0041156 | A1* | 2/2022 | Imamura | B60K 6/26 |
| 2022/0042584 | A1* | 2/2022 | Zhu | B60K 6/547 |

* cited by examiner

HYBRID VEHICLE

CROSS-REFERENCE TO RELATED APPLICATIONS

The present application claims priority from Japanese Patent Application No. 2019-056665 filed on Mar. 25, 2019, the entire contents of which are hereby incorporated by reference.

BACKGROUND

The disclosure relates to a hybrid vehicle.

As a drive system of a hybrid vehicle, a known power-split drive system includes a single internal combustion engine, a first electric motor to mainly generate power, a second electric motor coupled to a drive shaft, and a planetary gear mechanism to distribute motive power of the internal combustion engine to the first electric motor and the drive shaft. The power-split drive system has favorable features of both a parallel mode and a series mode.

As a drive system to drive front wheels, Japanese Unexamined Patent Application Publication (JP-A) No. 2018-001884 discloses a drive system including a single internal combustion engine (12), a first electric motor (MG1), a second electric motor (MG2) coupled to a drive shaft, and a second planetary gear mechanism (50) to distribute motive power of the internal combustion engine (12) to the first electric motor (MG1) and the drive shaft. This drive system further includes a direct clutch (CS) to directly couple the internal combustion engine and the first electric motor, a first planetary gear mechanism (48) to enable the output of the internal combustion engine to be output selectively at two transmission gear ratios, and two clutches (B1 and C1).

In the drive system disclosed in JP-A No. 2018-001884, the first electric motor (MG1) is switched between drive and power generation, and the clutches (B1 and C1) and the direct clutch (CS) are switched between a coupled state and an uncoupled state so as to selectively provide plural electric vehicle (EV) modes and series, parallel, and power-split (series-parallel) HV modes (see FIG. 2 of JP-A No. 2018-001884).

SUMMARY

An aspect of the disclosure provides a hybrid vehicle including: a planetary gear mechanism configured to transmit motive power among a first rotary element, a second rotary element, and a third rotary element; a first electric motor coupled to the first rotary element in a power transmittable manner; an internal combustion engine coupled to the second rotary element in a power transmittable manner; first drive wheels coupled to the third rotary element in a power transmittable manner; an inter-element clutch configured to switch between coupling and uncoupling two of the first rotary element, the second rotary element, and the third rotary element; a second electric motor configured to perform power running operation using power generated by the first electric motor; and second drive wheels coupled to the second electric motor in a power transmittable manner.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Generally, with a hybrid vehicle to improve fuel economy, there is a demand for implementing all-wheel drive (AWD) in HV modes to enhance traveling performance.

In a power-split hybrid vehicle of related art, two electric motors are used to drive one pair of drive wheels. Therefore, to implement electric AWD in the power-split hybrid vehicle, another electric motor is used to drive another pair of drive wheels, which results in a drive system including three electric motors in total. Since electric motors have large weight and volume and include components at high cost, the drive system including three electric motors increases the vehicle in weight and size and makes the cost soar.

It is desirable to provide a hybrid vehicle that makes it possible to implement AWD in the HV modes and also to prevent a drive system of the hybrid vehicle from increasing in weight, size, and cost.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
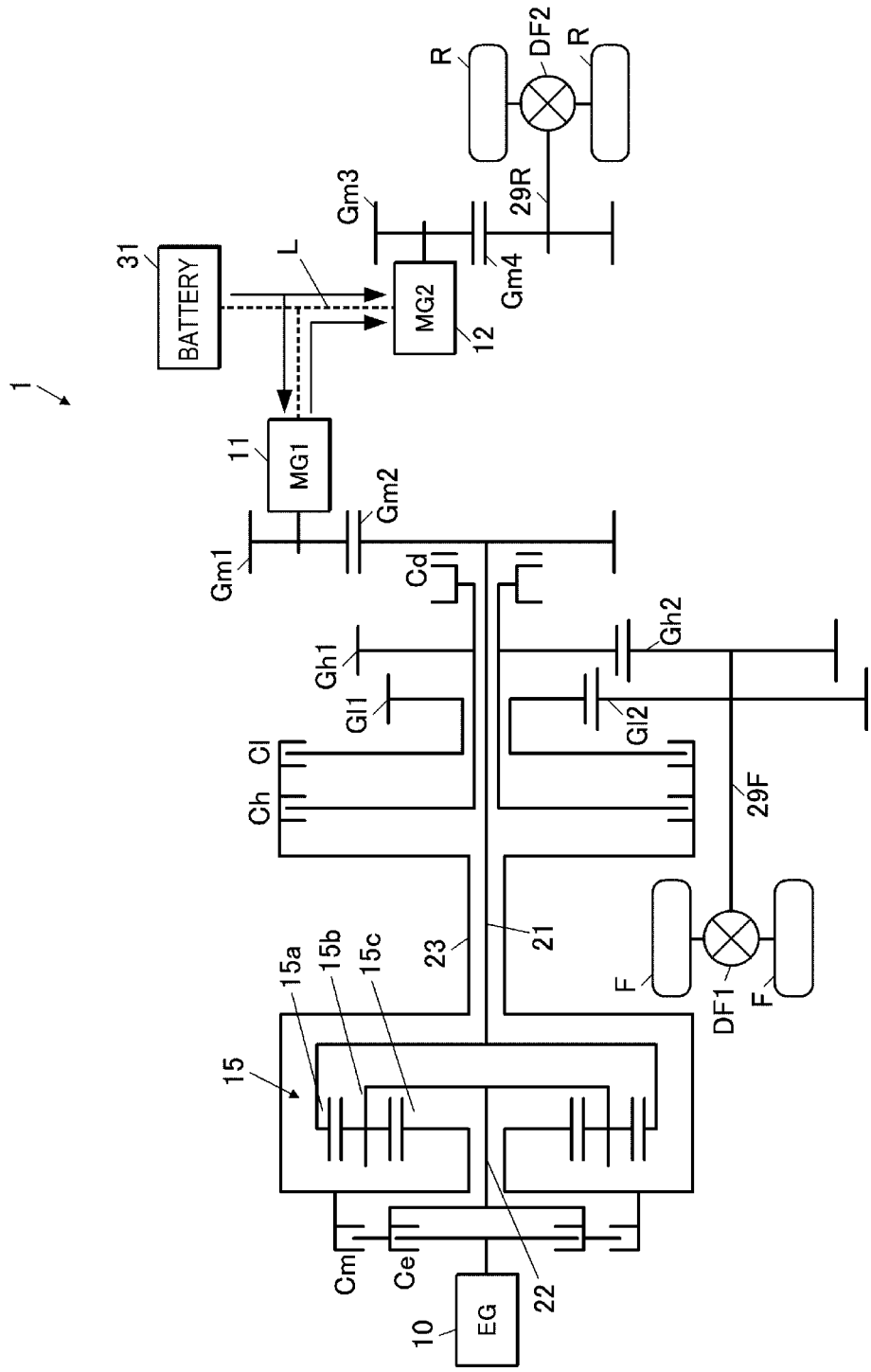
FIG. 1 is a diagram schematically illustrating a drive system of a hybrid vehicle according to a first embodiment of the disclosure.

FIG. 1 is a diagram schematically illustrating a drive system of a hybrid vehicle according to a first embodiment of the disclosure.

A hybrid vehicle 1 according to the first embodiment includes one pair of drive wheels (such as front wheels) F, the other pair of drive wheels (such as rear wheels) R, and a drive system to drive these drive wheels. The drive wheels F are coupled to a drive shaft 29F via a differential gear DF1. The drive wheels R are coupled to a drive shaft 29R via a differential gear DF2. In one embodiment, the one pair of drive wheels F may serve as "first drive wheels", and the other pair of drive wheels R may serve as "second drive wheels".

The drive system includes an engine 10, an engine transmission shaft 22, a first electric motor 11, a motor transmission shaft 21, a planetary gear mechanism 15, and an output transmission shaft 23. The engine 10 is an internal combustion engine. Motive power of the engine 10 is transmitted to the engine transmission shaft 22. The first electric motor 11 is capable of performing power running operation and regenerative operation. Motive power of the first electric motor 11 is transmitted to the motor transmission shaft 21. The planetary gear mechanism 15 is capable of distributing motive power of the engine 10. Motive power to be output to the drive shaft 29F is transmitted to the output transmission shaft 23. A motor shaft of the first electric motor 11 is coupled to the motor transmission shaft 21 via gears Gm1 and Gm2. The engine 10 is coupled to the engine transmission shaft 22 via an engine clutch Ce so as to be selectively uncoupled. The planetary gear mechanism 15 includes a first rotary element 15a, a second rotary element 15b, and a third rotary element 15c. For example, the first rotary element 15a is a ring gear, the second rotary element 15b is a planetary carrier, and the third rotary element 15c is a sun gear. The motor transmission shaft 21 is coupled to the first rotary element 15a. The engine transmission shaft 22 is coupled to the second rotary element 15b. The output transmission shaft 23 is coupled to the third rotary element 15c.

The drive system further includes high gears Gh1 and Gh2, a high clutch Ch, low gears Gl1 and Gl2, and a low clutch Cl. The high gears Gh1 and Gh2 are interposed between the output transmission shaft 23 and the drive shaft 29F in such a manner that the output transmission shaft 23 and the drive shaft 29F can be selectively coupled and uncoupled. The high clutch Ch performs this selective coupling and uncoupling. The low gears Gl1 and Gl2 are interposed between the output transmission shaft 23 and the drive shaft 29F in such a manner that the output transmission shaft 23 and the drive shaft 29F can be selectively coupled and uncoupled. The low clutch Cl performs this selective coupling and uncoupling. The drive system also includes a direct clutch Cd and an inter-element clutch Cm. The direct clutch Cd couples and uncouples the motor transmission shaft 21 and rotation shafts of the high gears Gh1 and Gh2. The inter-element clutch Cm couples and uncouples two of the first rotary element 15a to the third rotary element 15c of the planetary gear mechanism 15. In one embodiment, the high gears Gh1 and Gh2 may serve as a "first gear set". In one embodiment, the low gears Gl1 and Gl2 may serve as a "second gear set". In one embodiment, the high clutch Ch may serve as a "first clutch". In one example, the low clutch Cl may serve as a "second clutch". In one embodiment, the direct clutch Cd may serve as a "third clutch".

The drive system further includes a second electric motor 12 that is capable of performing power running operation and regenerative operation and drives the drive wheels R. A motor shaft of the second electric motor 12 is coupled to the drive shaft 29R of the drive wheels R via gears Gm3 and Gm4. The second electric motor 12 performs the power running operation when motive power is output from the drive wheels R, and performs the regenerative operation when braking force is generated from the drive wheels R.

An inverter, not illustrated, to drive the first electric motor 11 and an inverter, not illustrated, to drive the second electric motor 12 are coupled via a power line L. In addition, a battery 31 is coupled to the power line L. When power is accumulated in the battery 31, the first electric motor 11 and the second electric motor 12 can perform the power running operation using the power of the battery 31. The second electric motor 12 can perform the power running operation using power generated by the first electric motor 11. Power generated by the first electric motor 11 or the second electric motor 12 may be accumulated in the battery 31.

Shift Stage

With the drive system of the above-described configuration, as illustrated in the following gear setting table, the inter-element clutch Cm, the low clutch Cl, the high clutch Ch, and the direct clutch Cd are switched to change among first-speed to fourth-speed shift stages and a reverse shift stage. Each shift stage will now be described.

[Gear Setting Table]

| | Ce | Cm | Cl | Ch | Cd | Transmission gear ratio | Step ratio |
|---|---|---|---|---|---|---|---|
| First speed | ○/— | ○ | ○ | — | — | 2.8 | |
| Second speed | ○/— | — | ○ | — | ○ | 1.6 | 1.7 |
| Third speed | ○/— | ○ | — | ○ | — | 1 | 1.64 |
| Fourth speed | ○/— | — | — | ○ | — | 0.35 | 2.8 |
| Reverse | ○ | ○ | — | — | — | | |

Note:
"○" represents a clutch coupled state.
"—" represents a clutch uncoupled state.
"○/—" represents either one of a clutch coupled state and a clutch uncoupled state.

In the first speed, the inter-element clutch Cm is switched to a coupled state, so that the first rotary element 15a to the third rotary element 15c of the planetary gear mechanism 15, that is, the motor transmission shaft 21, the engine transmission shaft 22, and the output transmission shaft 23 rotate integrally. Further, the low clutch Cl is coupled, so that the motor transmission shaft 21, the engine transmission shaft 22, and the output transmission shaft 23 are coupled to the drive shaft 29F via the low gears Gl1 and Gl2.

In the first speed, when an engine speed of the engine 10 is determined, a rotational speed of the first electric motor 11 and a rotational speed of the drive shaft 29F are uniquely determined. Consequently, when the first electric motor 11 performs the power running operation, motive power of the engine 10 and motive power of the first electric motor 11 are added and output to the drive shaft 29F. When the first electric motor 11 performs the regenerative operation, part of the motive power of the engine 10 can be used to generate power during traveling. Using the generated power, the second electric motor 12 is driven to implement all-wheel drive of the drive wheels F and R.

Figure 2A:
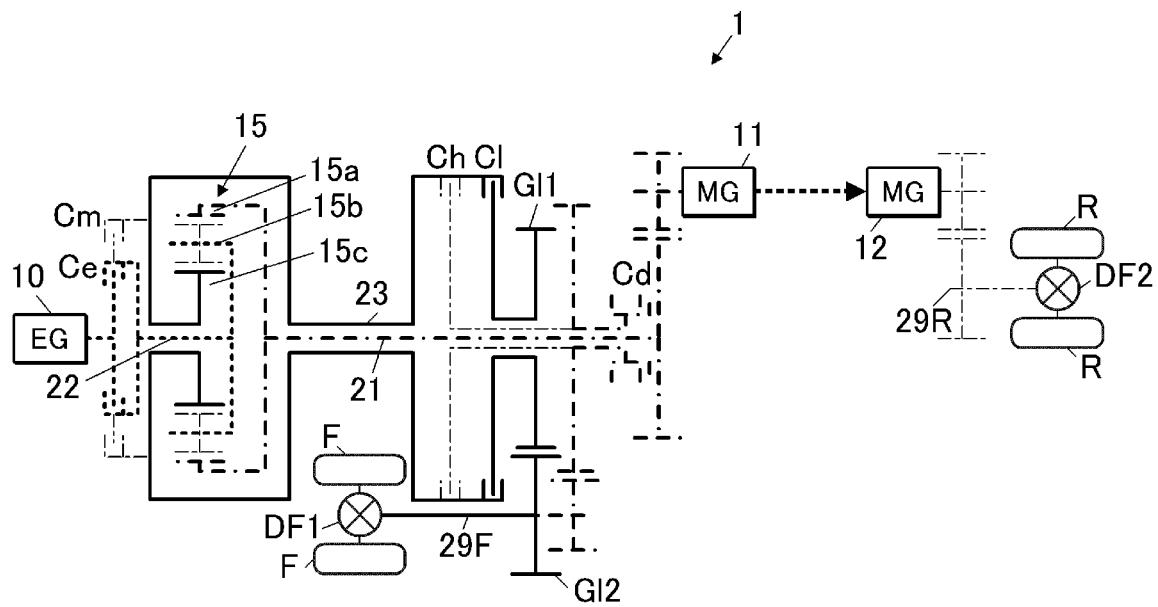
FIG. 2A is a diagram illustrating power transmission paths in a second speed in the hybrid vehicle illustrated in FIG. 1.
Figure 3A:
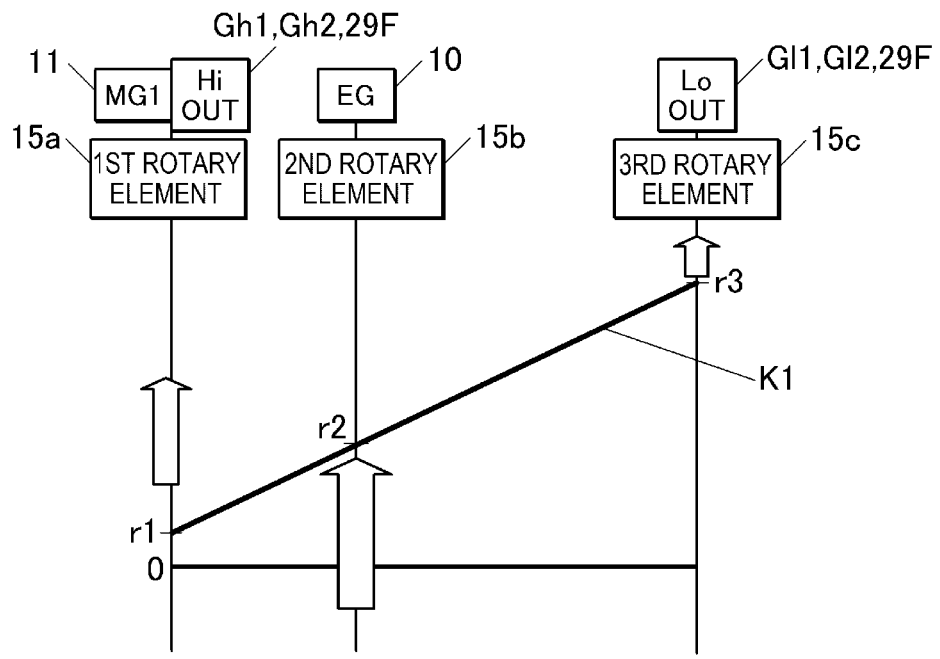
FIG. 3A is a collinear diagram illustrating operation in the second speed.

FIG. 2A is a diagram illustrating power transmission paths in the second speed. In FIG. 2A, a power transmission path of the engine 10, a power transmission path of the first electric motor 11, and a power transmission path to the drive shaft 29F are indicated with three kinds of thick lines. FIG. 3A is a collinear diagram illustrating the planetary gear mechanism 15 in the second speed. In FIG. 3A, "LoOUT" represents coupling the drive shaft 29F via the low gears Gl1 and Gl2, and "HiOUT" represents coupling the drive shaft 29F via the high gears Gh1 and Gh2.

In the second speed, the inter-element clutch Cm is switched to an uncoupled state, so that the first rotary element 15a to the third rotary element 15c of the planetary gear mechanism 15 can rotate at different speeds. However, using the direct clutch Cd, the motor transmission shaft 21 coupled to the first rotary element 15a is coupled to the drive shaft 29F via the high gears Gh1 and Gh2. Meanwhile, the low clutch C1 is coupled, so that the output transmission shaft 23 coupled to the third rotary element 15c is coupled to the drive shaft 29F via the low gears Gl1 and Gl2. Thus, the drive shaft 29F and the first rotary element 15a rotate at a first rotational ratio, and the drive shaft 29F and the third rotary element 15c rotate at a second rotational ratio. That is, an inclination of a relationship line K1 in the collinear diagram of FIG. 3A is limited to a constant value, and the first rotary element 15a and the third rotary element 15c are limited to rotating at a third rotational ratio. Consequently, as illustrated in the collinear diagram of FIG. 3A, the second rotary element 15b is limited to rotating at predetermined rotational ratios in accordance with the third rotational ratio between the first rotary element 15a and the third rotary element 15c. That is, a ratio (r1/r3) of a rotational speed r1 of the first rotary element 15a to a rotational speed r3 of the third rotary element 15c coincides with a ratio of a gear ratio of the low gears Gl1 and Gl2 to a gear ratio of the high gears Gh1 and Gh2. In accordance with the rotational speeds r1 and r3, the rotational speed r2 of the second rotary element 15b is uniquely determined.

Therefore, in the second speed as well, when an engine speed of the engine 10 is determined, a rotational speed of the first electric motor 11 and a rotational speed of the drive shaft 29F are uniquely determined. Consequently, when the first electric motor 11 performs the power running operation, motive power of the engine 10 and motive power of the first electric motor 11 are added and output to the drive shaft 29F. When the first electric motor 11 performs the regenerative operation, part of the motive power of the engine 10 can be used to generate power during traveling. Using the generated power, the second electric motor 12 is driven to implement all-wheel drive of the drive wheels F and R. A transmission gear ratio (that is, a reduction ratio of the rotational speed of the drive shaft 29F to the engine speed of the engine 10) in the second speed is lower than that in the first speed.

In the third speed, the inter-element clutch Cm is switched to a coupled state, so that the first rotary element 15a to the third rotary element 15c of the planetary gear mechanism 15, that is, the motor transmission shaft 21, the engine transmission shaft 22, and the output transmission shaft 23 rotate integrally. Further, the high clutch Ch is coupled, so that the motor transmission shaft 21, the engine transmission shaft 22, and the output transmission shaft 23 are coupled to the drive shaft 29F via the high gears Gh1 and Gh2.

In the third speed, when an engine speed of the engine 10 is determined, a rotational speed of the first electric motor 11 and a rotational speed of the drive shaft 29F are uniquely determined. Consequently, when the first electric motor 11 performs the power running operation, motive power of the engine 10 and motive power of the first electric motor 11 are added and output to the drive shaft 29F. When the first electric motor 11 performs the regenerative operation, part of the motive power of the engine 10 can be used to generate power during traveling. Using the generated power, the second electric motor 12 is driven to implement all-wheel drive of the drive wheels F and R. A transmission gear ratio in the third speed is lower than that in the second speed.

Figure 2B:
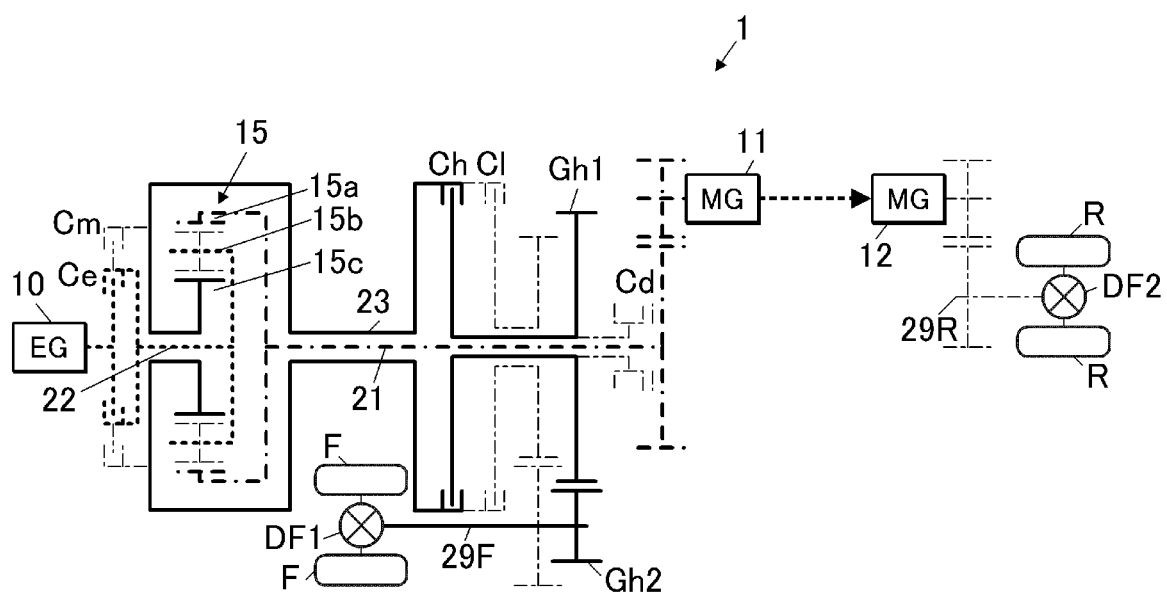
FIG. 2B is a diagram illustrating power transmission paths in a fourth speed in the hybrid vehicle illustrated in FIG. 1.
Figure 3B:
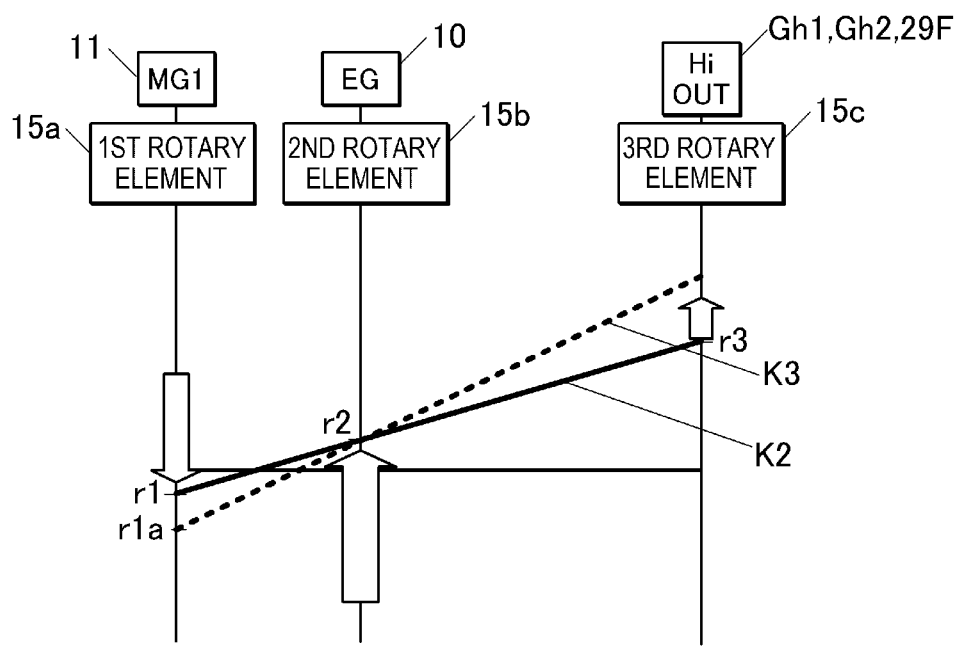
FIG. 3B is a collinear diagram illustrating operation in the fourth speed.

FIG. 2B is a diagram illustrating power transmission paths in the fourth speed. In FIG. 2B, a power transmission path of the engine 10, a power transmission path of the first electric motor 11, and a power transmission path to the drive shaft 29F are indicated with three kinds of thick lines. FIG. 3B is a collinear diagram illustrating the planetary gear mechanism in the fourth speed. In FIG. 3B, "HiOUT" represents coupling the drive shaft 29F via the high gears Gh1 and Gh2.

In the fourth speed, a power-split HV mode is implemented. That is, in the fourth speed, the inter-element clutch Cm is switched to an uncoupled state, so that the first rotary element 15a to the third rotary element 15c of the planetary gear mechanism 15 rotate at different speeds. Moreover, the low clutch C1 is uncoupled, the high clutch Ch is coupled, and the direct clutch Cd is uncoupled. Thus, the output transmission shaft 23 is coupled to the drive shaft 29F via the high gears Gh1 and Gh2. Then, motive power of the engine 10 is distributed to the first electric motor 11 and the drive shaft 29F via the first rotary element 15a to the third rotary element 15c of the planetary gear mechanism 15.

In the fourth speed, as illustrated in the collinear diagram of FIG. 3B, the rotational speed r3 of the drive shaft 29F is determined in accordance with the rotational speed r1 of the first electric motor 11 and the engine speed r2 of the engine 10. As indicated with relationship straight lines K2 and K3 in the collinear diagram, when the rotational speed of the first electric motor 11 changes (from r1 to r1a), a transmission gear ratio between the engine 10 and the drive shaft 29F changes.

In the fourth speed, as understood from the collinear diagram of FIG. 3B, when the engine speed r2 of the engine 10 is kept constant and the rotational speed r1 of the first electric motor 11 is increased, a gradient of the relationship straight line K2 changes to decrease. That is, the rotational speed r3 of the drive shaft 29F decreases. In the fourth speed, therefore, the power running operation of the first electric motor 11 increases the engine speed of the engine 10 and produces no effect of increasing output torque of the drive shaft 29F. Consequently, in the fourth speed, the first electric motor 11 simply performs the regenerative operation and is used to generate power.

In the fourth speed, therefore, the motive power of the engine 10 is distributed to the power generation in the first electric motor 11 and drive of the drive wheels F. The generated power is output to the second electric motor 12 to drive the other pair of drive wheels R. In other words, part of the motive power of the engine 10 is used to drive the one pair of drive wheels F, and the rest of the motive power of the engine 10 is used to drive the other pair of drive wheels R so as to implement all-wheel drive. Even when the battery 31 is exhausted upon a start of the hybrid vehicle 1, the engine 10 is driven at a medium to high engine speed, and the first electric motor 11 generates power, which drives the second electric motor 12 so as to avoid inefficiently low rotation drive of the engine 10 and to start up the hybrid vehicle 1 with enhanced energy efficiency. Moreover, in the fourth speed, changing the rotational speed of the first electric motor 11 is changed to vary the transmission gear ratio between the engine 10 and the drive wheels F.

It is noted that a shift stage may be added in which the low clutch C1 is coupled in the fourth speed instead of coupling the high clutch Ch. This shift stage enables a power-split HV mode of a transmission gear ratio different from the above-described transmission gear ratio in the fourth speed.

In the reverse, uncoupling the low clutch C1, the high clutch Ch, and the direct clutch Cd leads to uncoupling the drive shaft 29F and the engine 10 from each other, so that motive power of the engine 10 can be used for power generation in the first electric motor 11. Further, the second electric motor 12 performs power running operation in a reverse direction to drive the other pair of drive wheels R so as to enable rearward travel of the hybrid vehicle 1. When the battery 31 is exhausted, the first electric motor 11 generates power using motive power of the engine 10, so that the generated power can be used to drive the second electric motor 12. That is, in the series travel mode, the hybrid vehicle 1 can be driven rearward. It is noted that when sufficient power is accumulated in the battery 31, the inter-element clutch Cm and the low clutch C1 are switched to a coupled state whereas other clutches are switched to an uncoupled state, and the first electric motor 11 and the second electric motor 12 are controlled to perform power running operation in a reverse direction to enable rearward EV travel of the hybrid vehicle 1.

Transmission Gear Ratio at Each Shift Stage

Figure 4:
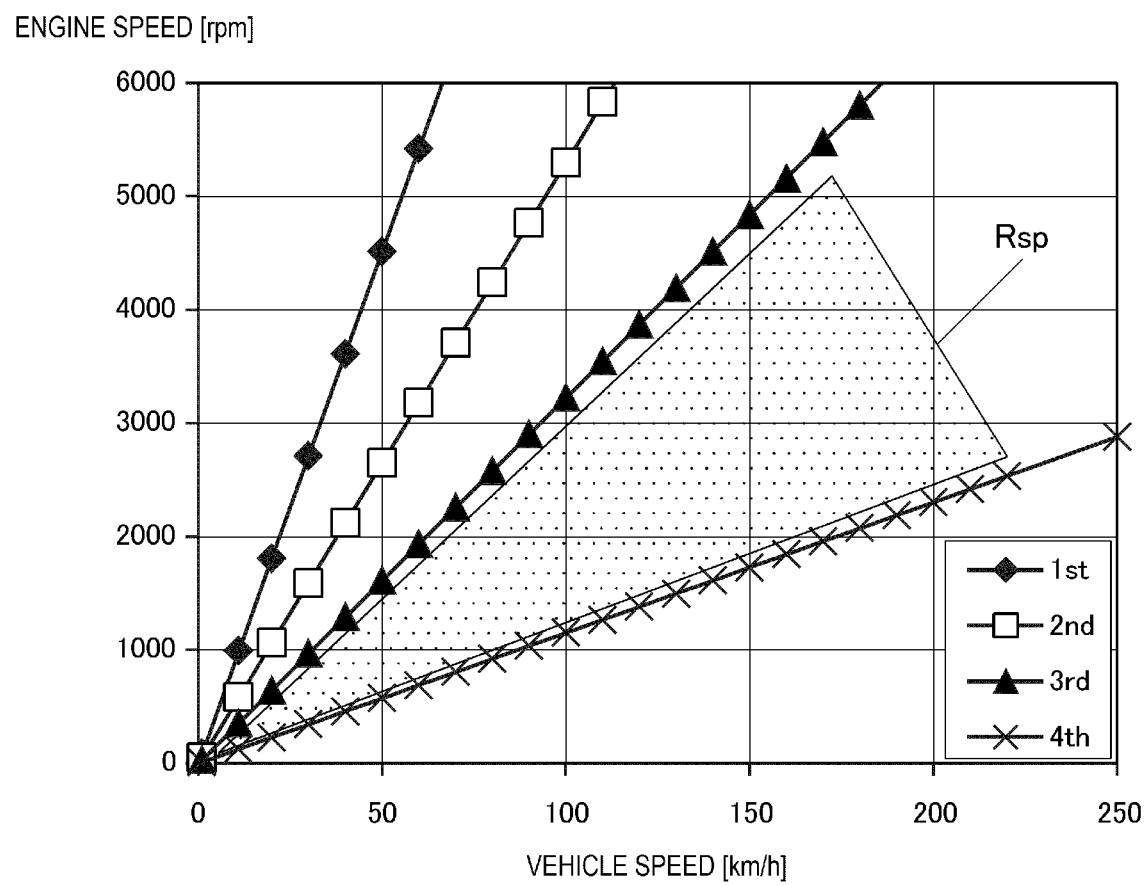
FIG. 4 is a graph illustrating a relationship between an engine speed and a vehicle speed at each shift stage.

FIG. 4 is a graph illustrating a relationship between an engine speed and a vehicle speed at each shift stage. In FIG. 4, a plotted line of the fourth speed represents a relationship at a stoppage of the first electric motor 11, and a power-split region Rsp represents a relationship between an engine speed and a vehicle speed in regenerative operation of the first electric motor 11.

As illustrated in FIG. 4, the drive system according to the first embodiment implements plural shift stages such that each pair of adjacent shift stages has an appropriately step ratio. Among these shift stages, in the first speed to the third speed having low transmission gear ratios, stoppage of the engine 10 and power running operation of the first electric motor 11 implement traveling in the EV modes. Drive of the engine 10 and power running operation of the first electric motor 11 implement traveling in the parallel HV mode. Further, when the first electric motor 11 performs regenerative operation, motive power of the engine 10 can be partly used to generate power, and the generated power can be used for charging the battery 31 or for power running operation of the second electric motor 12. Power running operation of the second electric motor 12 implements all-wheel drive of the hybrid vehicle 1. In the first speed to the third speed, the travel mode is suitably changed in accordance with the vehicle speed to enable traveling with enhanced energy efficiency. It is noted that a forward EV mode in a medium to high speed range can be also implemented by simply coupling the direct clutch Cd and power running operation of the first electric motor 11 or power running operation of the first electric motor 11 and the second electric motor 12.

In the fourth speed having a high transmission gear ratio, the power-split HV mode is implemented. When the rotational speed of the first electric motor 11 is changed, a transmission gear ratio between the engine 10 and the drive wheels F can be changed within the power-split region Rsp. Setting a high step ratio between the third speed and the fourth speed enlarges ratio coverage of the drive system. Meanwhile, control of the rotational speed of the first electric motor 11 enables adjustment of the transmission gear ratio of the fourth speed within the power-split region Rsp.

In the fourth speed, even at a low vehicle speed on an occasion such as a vehicle start, the engine 10 can be driven at a medium engine speed while power is generated by the first electric motor 11. The generated power can be used to charge the battery 31 or drive the drive wheels R so as to implement traveling with enhanced energy efficiency. It is noted that when the battery 31 has a low remaining capacity at a low vehicle speed on an occasion such as a vehicle start, the low clutch C1 instead of the high clutch Ch is coupled in the fourth speed to implement the power-split HV mode equivalent to that of the second speed. Alternatively, power running operation of the second electric motor 12 enables the series travel mode. In the fourth speed, therefore, in accordance with a situation such as a state of the battery 31 and demanded driving force of the hybrid vehicle 1, these travel modes are selectively adopted to implement a travel mode suited for the situation.

Output in Each Travel Mode

Figure 5:
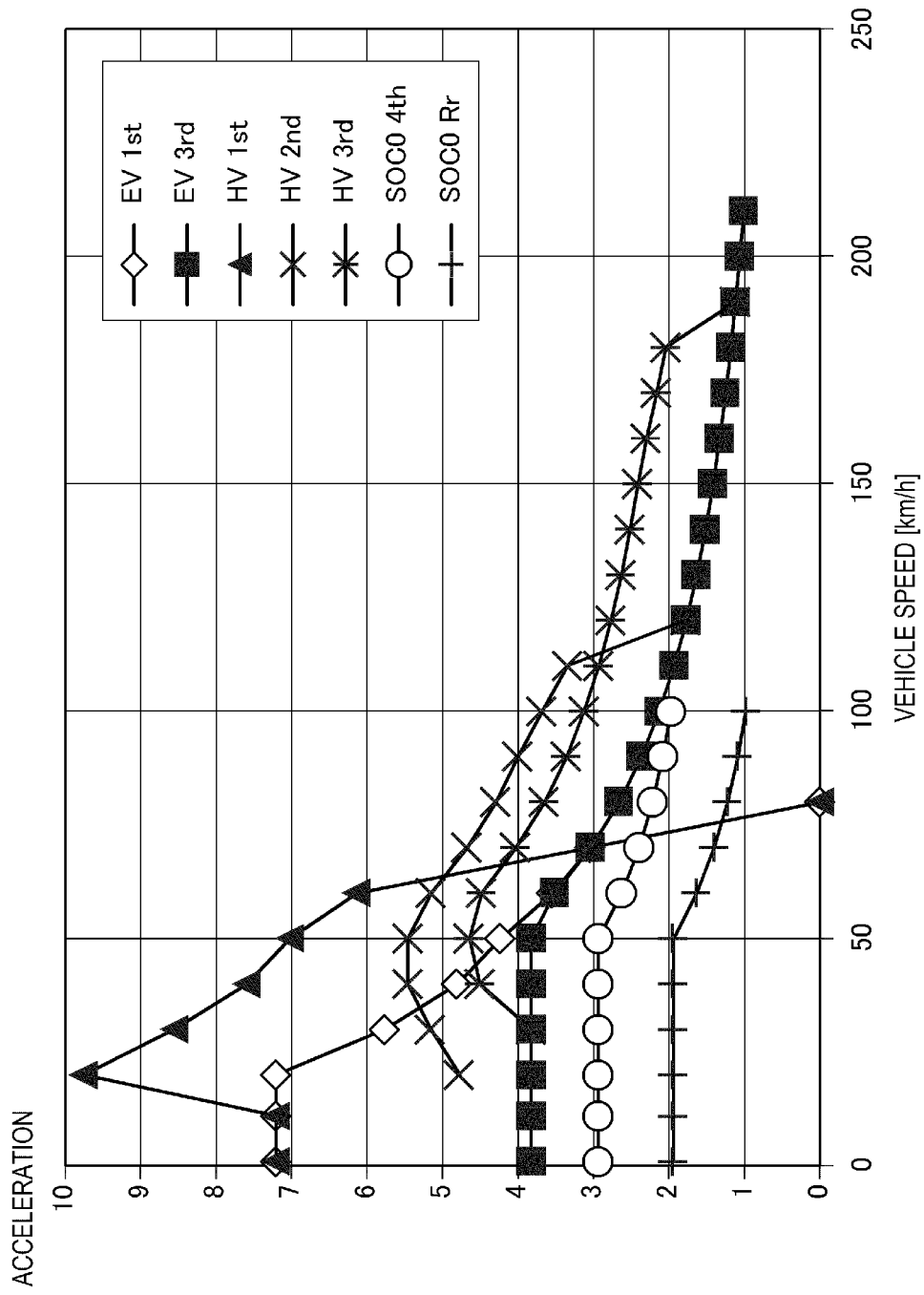
FIG. 5 is a graph illustrating a relationship between a vehicle speed and an acceleration in each travel mode.

FIG. 5 is a graph illustrating a relationship between a vehicle speed and an acceleration (driving force) in each travel mode. EV1st and EV3rd in FIG. 5 respectively represent maximum output characteristics at the time of uncoupling the engine clutch Ce and power running operation of the first electric motor 11 in the first-speed and third-speed shift stages. HV1st, HV2nd, and HV3rd respectively represent maximum output characteristics in the parallel travel mode in the first-speed, second-speed, and third-speed shift stages. SOC0_4th represents a maximum output characteristic in the fourth-speed shift stage when power is generated by the first electric motor 11 and the generated power is used to drive the other pair of drive wheels R. Of an acceleration of SOC0_4th, SOC0_Rr represents a component of driving force generated by the second electric motor 12.

As illustrated in FIG. 5, in the drive system according to the first embodiment, shift stages are appropriately changed to obtain favorable output characteristics such that a high acceleration can be provided at a low vehicle speed, and that an acceleration that can be output decreases moderately as the vehicle speed increases.

As the characteristics of SOC0_4th and SOC0_Rr indicate, the power-split travel mode is adopted to obtain a sufficient acceleration for starting or traveling rearward even at a low vehicle speed on a vehicle start or in rearward traveling. At this time, even when the battery 31 is exhausted, power generation by the first electric motor 11 enables drive of the second electric motor 12, and even when the vehicle speed is low, the engine speed of the engine 10 is increased to implement highly efficient drive.

As described above, the hybrid vehicle 1 according to the first embodiment of the disclosure includes the planetary gear mechanism 15 capable of distributing motive power of the engine 10 to the first electric motor 11 and the output transmission shaft 23, and the inter-element clutch Cm capable of coupling the rotary elements of the planetary gear mechanism 15. The hybrid vehicle 1 further includes the second electric motor 12 capable of power running operation using power generated by the first electric motor 11, and the drive wheels R driven by the second electric motor 12. Consequently, when the inter-element clutch Cm is switched to an uncoupled state, the power-split mode makes it possible to drive the one pair of drive wheels F using part of the motive power of the engine 10 and to drive the other pair of drive wheels R using the rest of the motive power. This implements all-wheel drive in the HV mode with improved efficiency. When the inter-element clutch Cm is switched to a coupled state, the engine 10, the first electric motor 11, and the drive wheels F are coupled to rotate at a constant rotational ratio so as to implement the parallel HV mode. These HV modes can be implemented using three power sources, namely, the engine 10, the first electric motor 11, and the second electric motor 12, to prevent the size and weight of the hybrid vehicle 1 from increasing and the cost from soaring.

The hybrid vehicle 1 according to the first embodiment of the disclosure further includes the high gears Gh1 and Gh2, the high clutch Ch, the low gears Gl1 and Gl2, and the low clutch C1. These components can change the transmission gear ratio between the output transmission shaft 23 coupled to the third rotary element 15c of the planetary gear mechanism 15 and the drive shaft 29F. Thus, in the parallel HV mode, for example, the transmission gear ratio is changed to implement shift stages having appropriate step ratios.

The hybrid vehicle 1 according to the first embodiment of the disclosure further includes the direct clutch Cd capable of coupling the motor transmission shaft 21 and the rotation shafts of the high gears Gh1 and Gh2. Switching the direct clutch Cd to a coupled state makes it possible to limit the rotational ratios of the rotary elements of the planetary gear mechanism 15 to the predetermined values. Thus, a transmission gear ratio in the parallel HV mode, for example, can be added to implement shift stages having appropriate step ratios.

Second Embodiment

Figure 6:
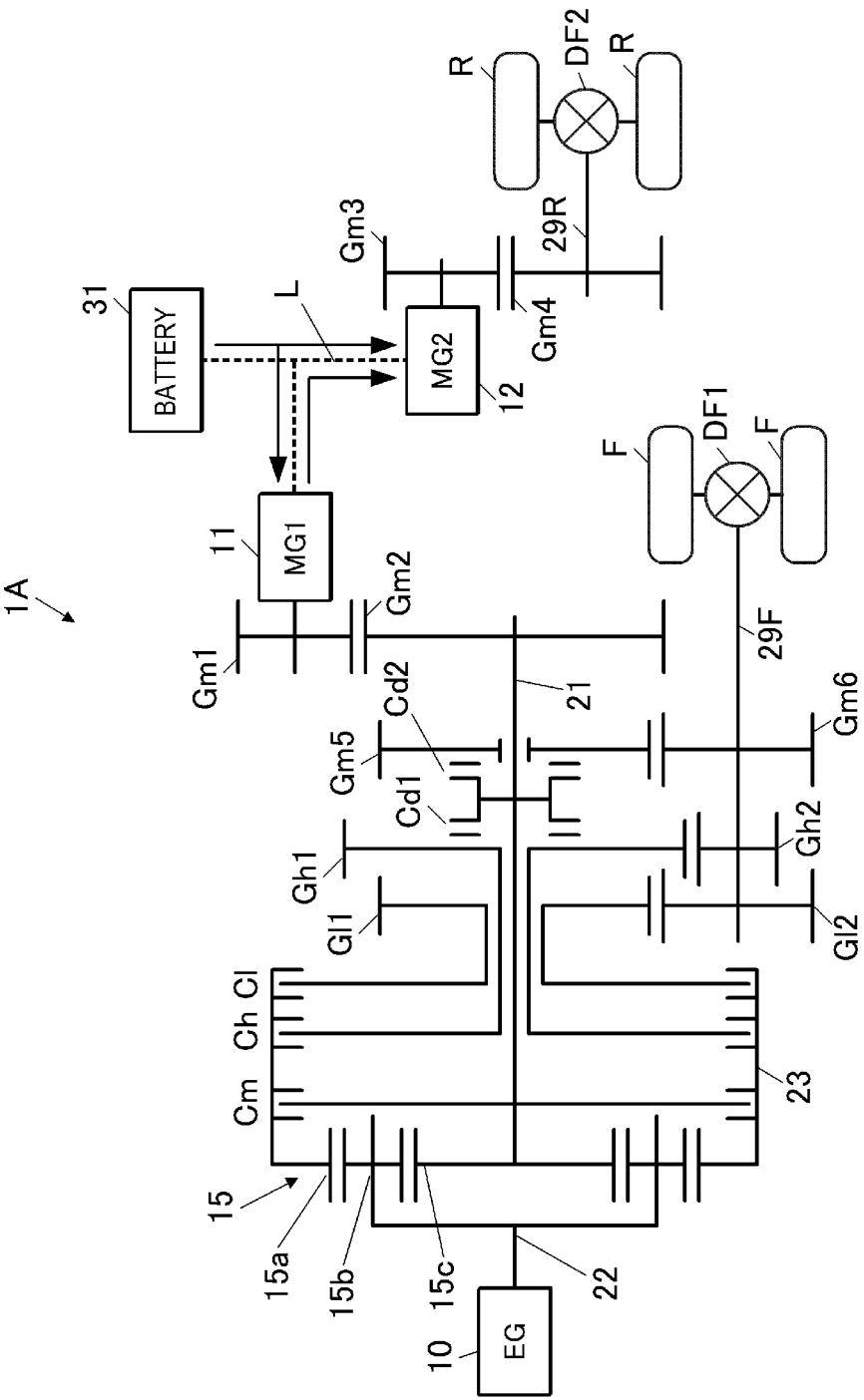
FIG. 6 is a diagram schematically illustrating a drive system of a hybrid vehicle according to a second embodiment of the disclosure.

FIG. 6 is a diagram schematically illustrating a drive system of a hybrid vehicle according to a second embodiment of the disclosure. In addition to main components of the drive system according to the first embodiment, a drive system of a hybrid vehicle 1A according to the second embodiment includes output gears Gm5 and Gm6 coupled to the drive shaft 29F in a power transmittable manner, and a second direct clutch Cd2 capable of coupling the motor transmission shaft 21 and rotation shafts of the output gears Gm5 and Gm6. The drive system according to the second embodiment has the configuration of the first embodiment from which the engine clutch Ce is omitted. Substantially the same components as in the first embodiment are denoted with identical reference numerals and signs and will not be elaborated here. In one embodiment, the output gears Gm5 and Gm6 may serve as a "third gear set". In one embodiment, a first direct clutch Cd1 may serve as a "third clutch". In one embodiment, the second direct clutch Cd2 may serve as a "fourth clutch".

According to the second embodiment, among the first rotary element 15a to the third rotary element 15c of the planetary gear mechanism 15, the first rotary element 15a to which the first electric motor 11 is coupled in a power transmittable manner is a sun gear, and the third rotary element 15c to which the output transmission shaft 23 to which motive power output to the drive shaft 29F is transmitted is coupled is a ring gear.

According to the second embodiment, the first direct clutch Cd1 and the second direct clutch Cd2 are switched to directly couple the motor transmission shaft 21 and the drive shaft 29F at two transmission gear ratios. The first direct clutch Cd1 functions in substantially the same manner as the direct clutch Cd according to the first embodiment and can couple the motor transmission shaft 21 and the drive shaft 29F via the high gears Gh1 and Gh2. The second direct clutch Cd2 can couple the motor transmission shaft 21 and the drive shaft 29F via the output gears Gm5 and Gm6.

With this configuration, the rotational ratio among the engine 10, the first electric motor 11, and the drive shaft 29F described in the second-speed shift stage according to the first embodiment can be changed between two rotational ratios by switching the first direct clutch Cd1 and the second direct clutch Cd2.

In the drive system according to the second embodiment, the inter-element clutch Cm, the low clutch C1, and the high clutch Ch are switched to an uncoupled state, and the first direct clutch Cd1 or the second direct clutch Cd2 is coupled so that an EV mode of the two transmission gear ratios can be implemented while the engine clutch Ce is eliminated.

As described above, the hybrid vehicle 1A according to the second embodiment additionally includes the output gears Gm5 and Gm6 and the second direct clutch Cd2 to increase switchable shift stages and facilitate adjustment of a step ratio between each adjacent pair of the shift stages.

The embodiments of the disclosure have been described so far. However, the disclosure is not limited to the above embodiments. In the embodiments, as the configuration to change the transmission gear ratio to two levels, an application example includes the high gears Gh1 and Gh2 and the low gears Gl1 and Gl2, and the high clutch Ch and the low clutch C1 to respectively switch the high gears Gh1 and Gh2 and the low gears Gl1 and Gl2 between the output transmission shaft 23 and the drive shaft 29F. However, the configuration to change the transmission gear ratio to two levels can be replaced with various other configurations such as a combination of the planetary gear mechanism, a clutch to switch some of the rotary elements of the planetary gear mechanism to a fixed state, and a clutch to couple the elements. Various modifications of the specific configuration of the drive system are possible. For example, a friction brake may be added to apply braking force to the motor transmission shaft when regenerative operation of the first electric motor cannot be performed, and the inter-element clutch for the planetary gear mechanism may be provided for pairs of rotary elements different from those in the embodiments. Other details described in the embodiments may be changed as appropriate without departing from the subject matter of the disclosure.

The invention claimed is:

1. A hybrid vehicle comprising:
a planetary gear mechanism configured to transmit motive power among a first rotary element, a second rotary element, and a third rotary element;
a first electric motor coupled to the first rotary element in a power transmittable manner;
an internal combustion engine coupled to the second rotary element in a power transmittable manner;
first drive wheels coupled to the third rotary element in a power transmittable manner;
an inter-element clutch configured to switch between coupling and uncoupling two of the first rotary element, the second rotary element, and the third rotary element;
a second electric motor configured to perform power running operation using power generated by the first electric motor;
second drive wheels coupled to the second electric motor in a power transmittable manner;
a first gear set and a second gear set disposed in a first power transmission path from the third rotary element to the first drive wheels, the first gear set and the second gear set being configured to transmit motive power at different transmission gear ratios; and
a first clutch configured to switch between coupling and uncoupling the first gear set and the first power transmission path.

2. The hybrid vehicle according to claim 1, further comprising:
a second clutch configured to switch between coupling and uncoupling the second gear set and the first power transmission path.

3. The hybrid vehicle according to claim 2, further comprising:
a third clutch configured to couple a rotation shaft of a power transmission path from the first electric motor to the first rotary element and rotation shafts of the first gear set.

4. The hybrid vehicle according to claim 3, further comprising:
a third gear set configured to transmit motive power to the first drive wheels; and
a fourth clutch configured to couple the rotation shaft of the power transmission path from the first electric motor to the first rotary element and rotation shafts of the third gear set.

* * * * *